(12) United States Patent
Noman et al.

(10) Patent No.: US 10,855,201 B1
(45) Date of Patent: Dec. 1, 2020

(54) CASCADED MULTILEVEL INVERTER

(71) Applicant: KING SAUD UNIVERSITY, Riyadh (SA)

(72) Inventors: Abdullah Mohammed Ali Noman, Riyadh (SA); Abdulaziz Abdullah Alkuhayli, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/892,707

(22) Filed: Jun. 4, 2020

(51) Int. Cl.
| | | |
|---|---|---|
| H02M 7/483 | (2007.01) | |
| H02M 7/5387 | (2007.01) | |
| H02J 3/38 | (2006.01) | |
| H02M 1/00 | (2006.01) | |

(52) U.S. Cl.
CPC ............. H02M 7/483 (2013.01); H02J 3/381 (2013.01); H02M 7/53873 (2013.01); *H02M 2001/0003* (2013.01); *H02M 2001/007* (2013.01)

(58) Field of Classification Search
CPC ............. H02M 7/483; H02M 7/53873; H02M 2001/0003; H02M 2001/007; H02J 3/381
USPC .................................................... 363/65, 71
See application file for complete search history.

(56) References Cited

U.S. PATENT DOCUMENTS

| | | |
|---|---|---|
| 4,847,745 A | 7/1989 | Shelchawat et al. |
| 5,642,275 A | 6/1997 | Peng et al. |
| 8,259,480 B2 | 9/2012 | Hasler |
| 9,343,989 B2 * | 5/2016 | Baruschka ............ H02M 5/293 |
| 9,571,004 B2 * | 2/2017 | Lavieville ............. H02M 7/483 |
| 9,893,532 B2 * | 2/2018 | Harrison ................. H02J 3/381 |
| 2015/0236611 A1* | 8/2015 | Nakazawa ............... H02M 1/36 363/123 |
| 2016/0139643 A1* | 5/2016 | Hasler ...................... G06F 1/26 700/297 |

FOREIGN PATENT DOCUMENTS

| | | |
|---|---|---|
| CN | 108377105 A | 8/2018 |
| CN | 108418461 A | 8/2018 |

OTHER PUBLICATIONS

Yu et al., "Delta-Connected Cascaded H-Bridge Multilevel Converters for Large-Scale Photovoltaic Grid Integration", IEEE Transactions on Industrial Electronics (2017), vol. 64, pp. 8877-8886 (Abstract only).

* cited by examiner

*Primary Examiner* — Gary L Laxton
(74) *Attorney, Agent, or Firm* — Nath, Goldberg & Meyer; Richard C. Litman (57) ABSTRACT

The cascaded multilevel inverter utilizes a delta polyphase circuit and transformers in each leg using cross-phase connection windings. Transformers corresponding to a number of phases of the inverter use an in-phase connection winding and a cross-phase connection winding to respective other legs, so that the respective transformers having the in-phase connection windings are connected in series with a DC power supply.

14 Claims, 10 Drawing Sheets

CASCADED MULTILEVEL INVERTER

BACKGROUND

1. Field

The disclosure of the present patent application relates to multilevel inverters, and particularly to a cascaded multilevel inverter based on a delta-connected cascaded H-bridge topology for grid-connected applications.

2. Description of the Related Art

Inverters are often used to connect multiple DC power sources, e.g., from solar or photovoltaic cells, to an AC power grid. According to the number of output voltage levels generated from an inverter, the inverter can be classified into one of two groups: two-level inverters or multilevel inverters (MLI). The elementary concept of employing a multilevel converter to achieve higher power is to use a series of power semiconductor switches with several lower voltage DC sources to perform the power conversion by synthesizing a staircase voltage waveform. The term multilevel began with the three-level converter. Subsequently, several MLI topologies have been developed. The higher the number of output voltage levels, the better the output voltage and current quality. In addition, the sizes of the output filters and the voltage stresses on semiconductor switches could be reduced. Furthermore, due to minimizing the switching frequency, the efficiency of MLIs is high.

The most common MLI topologies can be classified into three types: neutral point MLI, flying capacitor MLI, and cascaded H-bridge. The cascaded H-bridge (CHB) MLI is considered one of the most suitable configurations to be used in next-generation large-scale photovoltaic (PV) power plants, attracting significant research interest both from the technical and financial perspective. The CHB MLI includes a series connection of several H-bridge cells. Compared to the other conventional MLI topologies, it uses fewer semiconductor switches at the same levels. Due to the separated DC source feature of the CHB topology, it can be used for numerous applications, such as standalone systems, grid-connected PV systems, and active filters. The CHB configuration can be connected as a star as well as a delta connection. Each connection has different applications. The delta-connected CHB MLI can be used for static synchronous compensation (STATCOM), and it is easy to implement individual phase control. It has received great attention in STATCOM applications required to handle negative sequence reactive power. The delta-connected H-bridge inverter has recently drawn attention as a promising alternative to the star-connected bridge inverter in PV applications.

Nevertheless, to avoid under-balanced PV generation, the delta connection requires a greater number of bridges cascaded in series than the star connection to reach the line-to-line grid voltage, thus inevitably increasing the size of the converter. Therefore, the delta-connected H-bridges are more costly than star-connected H-bridges to synthesize the same line-line voltages. It requires a bridge number 3 times larger, since one phase leg must synthesize the line-to-line voltage.

Thus, a cascaded multilevel inverter solving the aforementioned problems is desired.

SUMMARY

A cascaded multilevel inverter is configured as a delta or end-connected polyphase circuit. The circuit comprises a plurality of transformers corresponding to a number of phases of the multilevel inverter. Each transformer has an in-phase connection winding and a cross-phase connection winding to respective other legs. A plurality of legs correspond to the number of phases of the multilevel inverter, each comprising one of the transformers, with the respective transformers having the in-phase connection windings connected in series with a DC power supply. The transformers have their cross-phase connection windings connected to different phase legs with different ones of the transformers having their cross-phase connection windings connected on opposite sides of the in-phase connection windings within the leg connected to the cross-phase connection winding.

In one particular exemplary configuration, the legs and transformer connections are configured in multiples of three.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The cascaded multilevel inverter is a three-phase cascaded multilevel inverter for grid-connected photovoltaic (PV) applications. The inverter is based on a delta-connected cascaded H-bridge (CHB), wherein three coupled transformers are substituted for the inductors to thereby synthesize the line-line voltage levels. Through the use of these coupled transformers, the line-line voltage levels of the disclosed topology are the same as the line-line voltage levels of the star-connected CHB topology, unlike previous delta-connected CHBs.

The multilevel inverter introduces a technique based on a delta-connected CHB configuration to increase the number of voltage levels of the line-line voltages to the number of levels generated by the star-connected CHB. The number of required H-bridges are the same to generate the same line-line voltage levels. The configuration is mathematically modeled and it is built in the SIMULINK environment to test its accuracy and effectiveness. Simulation results are provided to prove the disclosed topology.

The multilevel inverter relates to a three-phase cascaded multilevel inverter topology. The conventional delta-connected cascaded H-bridge multilevel inverter topology has a drawback compared to the star-connected cascaded H-bridge multilevel inverter. It requires a greater number of H-bridges cascaded in series than the star connection to reach the line-to-line grid voltage, thus inevitably increasing the size of the inverter. Therefore, the present multilevel inverter introduces a new topology for the delta-connected cascaded H-bridge inverter for grid-connected photovoltaic (PV) applications. The multilevel inverter has the same number of the line-line voltage levels generated by the star-connected CHB for the same number of switches. Mathematical modeling of the disclosed topology and the simulation results are presented to verify the disclosed topology's effectiveness and reliability.

The cascaded multilevel inverter relates to a three-phase multilevel inverter, which can be used for different applications such as PV-grid connection, active power filters, STATCOMs, etc. It is based on a delta-connected cascaded H-bridge multilevel inverter. The disclosed technique improves the performance of the delta-connected cascaded H-bridge by inserting three coupled transformers instead of the three inductors in the conventional delta-connected cascaded H-bridge inverter. These transformers are connected in such a way as to increase the number of voltage levels compared to the conventional delta-connected cascaded H-bridge inverter for the same number of switches.

The cascaded multilevel inverter provides an improved multilevel inverter based on a delta-connected cascaded multilevel inverter for high voltage/high power grid-connected applications. The cascaded multilevel inverter uses fewer semiconductor devices than conventional multilevel inverters. A method for controlling the cascaded multilevel inverter supplies an approximately sinusoidal power waveform for an AC high voltage, high power system from a plurality of DC voltage sources for a variety of applications.

Figure 1A:
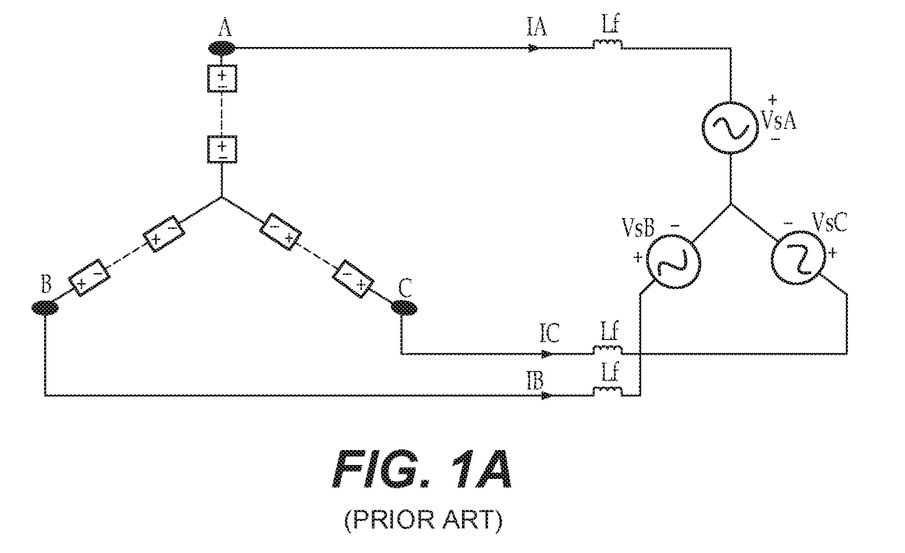
FIG. 1A is a schematic diagram of a multilevel inverter of the prior art, showing an exemplary star-connected cascaded H-bridge topology.
Figure 1B:
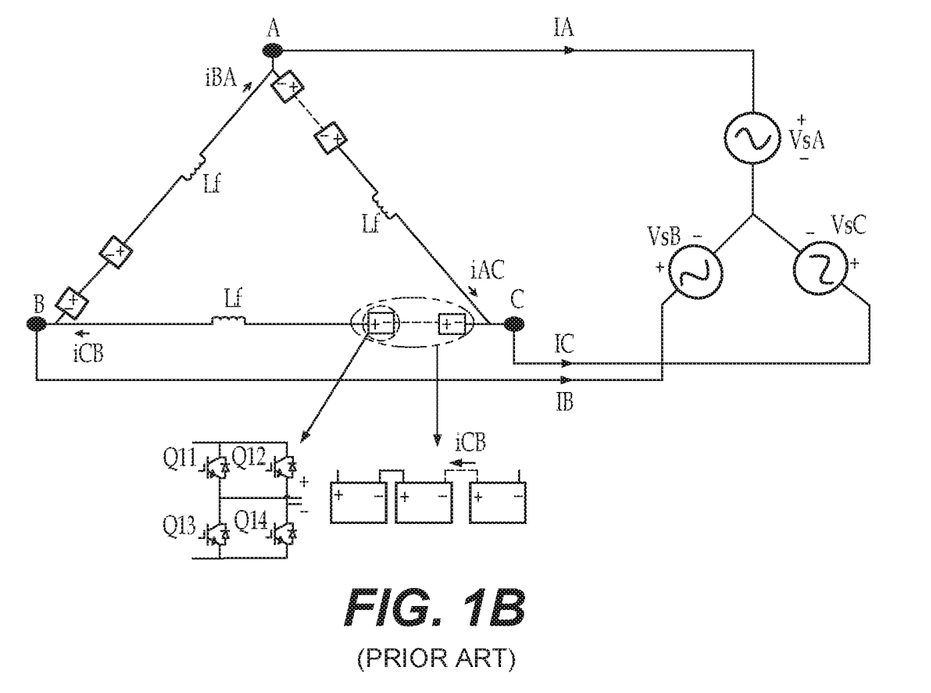
FIG. 1B is a schematic diagram of a multilevel inverter of the prior art, showing an exemplary delta-connected cascaded H-bridge topology.

FIGS. 1A and 1B (prior art) are schematic diagrams showing (FIG. 1A) a star-connected cascaded H-bridge (CHB) topology and (FIG. 1B) a conventional delta-connected CHB topology. The number of the line-line voltage levels of the delta-connected CHB is the same as the line-neutral voltage levels of the star-connected CHB MLI, as can be seen in FIG. 1A. FIG. 1B shows a conventional delta-connected CHB topography. At the same line-line voltage, the number of H-bridges of the delta-connected CHB MLI is $\sqrt{3}$ times larger than the number of H-bridges of the star-connected CHB, which, in turn, increases the cost of the delta-connected CHB. Moreover, the switching losses and the conduction losses are higher, and hence the inverter efficiency of the delta-connected CHB is lower than the efficiency of the star-connected CHB at the same line-line voltage levels. Therefore, the disclosed technique is introduced to modify the delta-connected CHB in order to generate line-line voltage levels as the same line-line voltage levels of the star-connected CHB from the same number of H-bridges.

Figure 2:
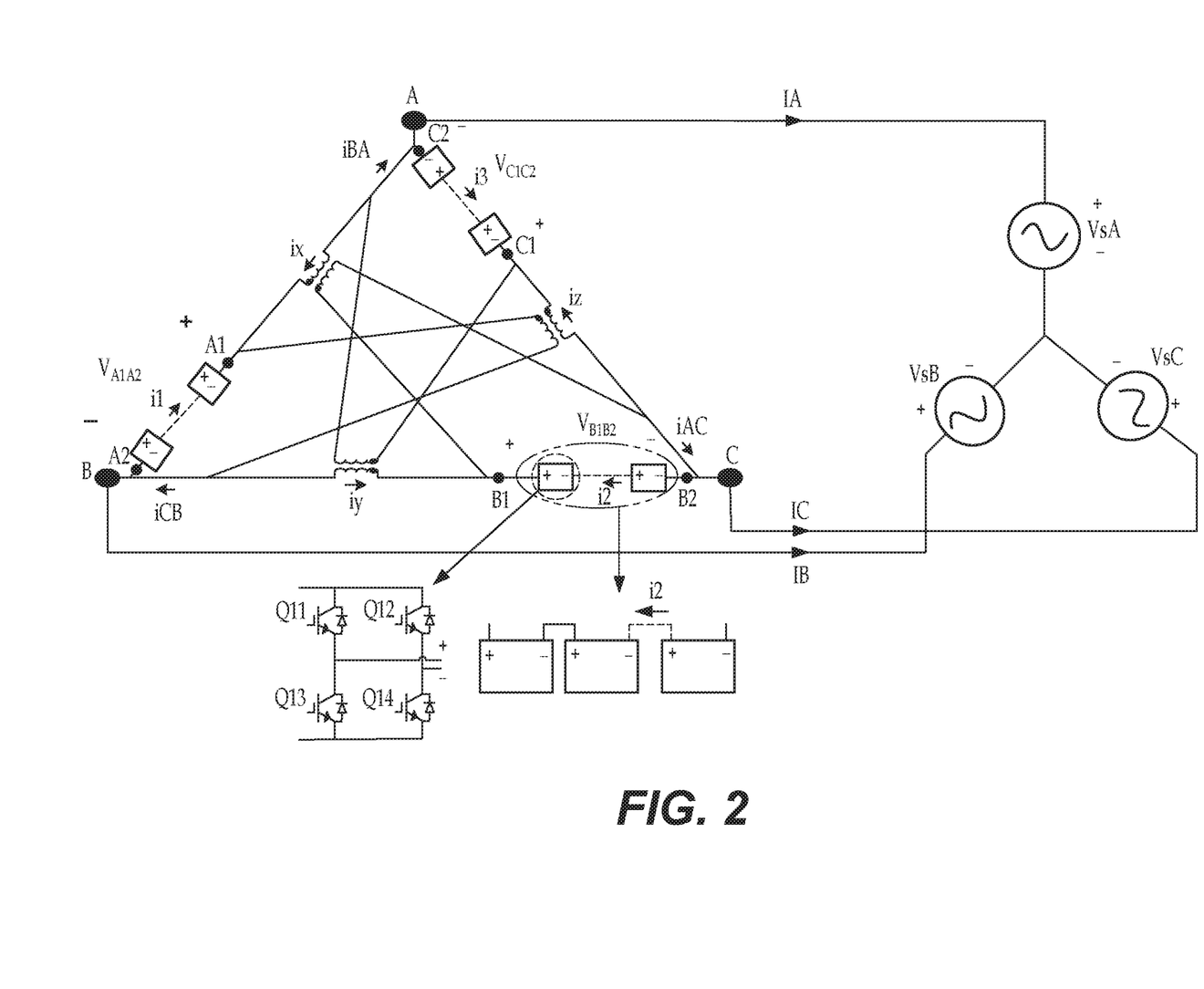
FIG. 2 is a schematic diagram showing a cascaded multilevel inverter topology according to the present disclosure.

The multilevel inverter is a modified topology for the delta-connected cascaded H-bridge MLI. FIG. 2 is a schematic diagram showing CHB topology configured according to the present disclosure. As shown in this Figure, three coupled transformers are used instead of the inductors to synthesize the line-line voltage levels. With the help of these coupled transformers, the line voltage levels of the present cascaded multilevel inverter is the same as the line-line voltage levels of the star-connected CHB topology. The same number of switches to generate a certain number of line-line voltage levels can be used in the present multilevel inverter to generate the same levels.

In addition, there is no need to use interface inductors for grid-connection application. On the other hand, the coupled transformers in the present multilevel inverter can also be used to step up the generated voltage without the need to use an external step up transformer at the point of coupling with the utility.

Using a CHB configuration such as the configuration shown in FIG. 2, applying KVL yields:

$$v_{sA} - v_{C2A1} - v_{A1A2} - v_{sB} = 0$$

$$v_{sB} - v_{A2B1} - v_{B1B2} - v_{sC} = 0$$

$$v_{sC} - v_{B2C1} - v_{C1C2} - v_{sA} = 0 \quad (1)$$

Assuming that the turn ratios of the coupled transformers are unity, equation (1) can be written as:

$$v_{AB} = v_{B2B1} + v_{A1A2}$$

$$v_{BC} = v_{C2C1} + v_{B1B2}$$

$$v_{CA} = v_{A2A1} + v_{C1C2} \quad (2)$$

The root-mean square (RMS) values of the voltages across the H-bridge cell in the disclosed topology can be given as:

$$V_{A1A2} = \frac{Nm_a V_{dc}}{\sqrt{2}} \angle 0° \quad (3)$$

$$V_{B1B2} = \frac{Nm_a V_{dc}}{\sqrt{2}} \angle -120°$$

$$V_{C1C2} = \frac{Nm_a V_{dc}}{\sqrt{2}} \angle +120°$$

Substituting equation (3) into equation (2), we get:

$$V_{AB} = \sqrt{3} Nm_a V_{dc} \sin(\omega t + 30°)$$

$$V_{BC} = \sqrt{3} Nm_a V_{dc} \sin(\omega t - 90°)$$

$$V_{CA} = \sqrt{3} Nm_a V_{dc} \sin(\omega t + 150°) \quad (4)$$

Equation (4) demonstrates that the generated line-line voltage of the disclosed topology is the same as the line-line voltage of the star-connected CHB.

The internal currents of the CHB in each phase can be given as:

$$\begin{bmatrix} i_1 \\ i_2 \\ i_3 \end{bmatrix} = \begin{bmatrix} i_z - i_x \\ i_x - i_y \\ i_y - i_z \end{bmatrix} \quad (5)$$

where $i_x$, $i_y$, and $i_z$ are the currents flowing in the primary side of the coupled transformers $T_x$, $T_y$ and $T_z$, respectively.

Assuming the magnetizing inductances of the coupled transformers are high, so that:

$$i_x + i_y + i_z = 0, \quad (6)$$

from equations (5) and (6), the currents of each coupled transformer can be expressed as:

$$\begin{bmatrix} i_x \\ i_y \\ i_z \end{bmatrix} = \frac{\sqrt{2}}{\sqrt{3}} I \begin{bmatrix} \sin(\omega t + 150°) \\ \sin(\omega t + 90°) \\ \sin(\omega t - 30°) \end{bmatrix} \quad (7)$$

In addition, the grid currents can be given as:

$$\begin{bmatrix} I_A \\ I_B \\ I_C \end{bmatrix} = \begin{bmatrix} -i_3 - i_x + i_y \\ -i_1 - i_y + i_z \\ -i_2 - i_z + i_x \end{bmatrix} \quad (8)$$

Substituting equations (7) and (8) into equation (5), the three-phase grid currents can be given as:

$$\begin{bmatrix} I_A \\ I_B \\ I_C \end{bmatrix} = \begin{bmatrix} i_1 \\ i_2 \\ i_3 \end{bmatrix} = \sqrt{2} I \begin{bmatrix} \sin(\omega t) \\ \sin(\omega t - 120°) \\ \sin(\omega 7 + 120°) \end{bmatrix} \quad (9)$$

where i is the RMS grid current.

Equation (9) proves that the grid currents and the internal currents in each CHB phase in the disclosed topology are the same. Moreover, the currents, $i_{AC}$, $i_{CB}$ and $i_{BA}$ can be given as:

$$\begin{bmatrix} i_{AC} \\ i_{CB} \\ i_{BA} \end{bmatrix} = \begin{bmatrix} i_2 + i_C \\ i_1 + i_B \\ i_3 + i_A \end{bmatrix} = -\begin{bmatrix} i_1 \\ i_3 \\ i_2 \end{bmatrix} = \sqrt{2} I \begin{bmatrix} \sin(\omega t - 180°) \\ \sin(\omega t - 60°) \\ \sin(\omega t + 60°) \end{bmatrix} \quad (10)$$

The total apparent power of the N H-bridge cells connected to each phase satisfies the following equations:

$$(VA_{cells\_a}) = V_{A1A2} I_{1rms} = \frac{N m_a V_{dc}}{\sqrt{2}} I \quad (11)$$

$$VA_{cells\_b} = V_{B1B2} I_{2rms} = \frac{N m_a V_{dc}}{\sqrt{2}} I$$

$$VA_{cells\_c} = V_{C1C2} I_{3rms} = \frac{N m_a V_{dc}}{\sqrt{2}} I$$

In addition, the apparent power of each coupled transformer can be given as:

$$(VA_{T_x}) = V_{B1B2} I_{xrms} = \frac{N m_a V_{dc} I}{\sqrt{6}} \quad (12)$$

$$(VA_{T_y}) = V_{C1C2} I_{yrms} = \frac{N m_a V_{dc} I}{\sqrt{6}}$$

-continued $$(VA_{T_z}) = V_{A1A2} I_{zrms} = \frac{N m_a V_{dc} I}{\sqrt{6}}$$

where $VA_{T_x}$, $VA_{T_y}$ and $VA_{T_z}$ are the apparent powers of the coupled transformers of phases a, b, and c, respectively. Equation (12) demonstrates the apparent power of each coupled transformer is $(1/\sqrt{3})$ of the CHB cells of one phase.

Moreover, the total apparent power of the disclosed topology can be expressed as:

$$(VA_T) = \sqrt{3} V_{AB} I_{Arms} = 3 \frac{N m_a V_{dc}}{\sqrt{2}} I \quad (13)$$

The cascaded multilevel inverter can be used in various applications, such as grid-connected PV applications, active power filters, etc. In the present disclosure, it is exemplified as used for a grid-connected PV application.

Figure 3:
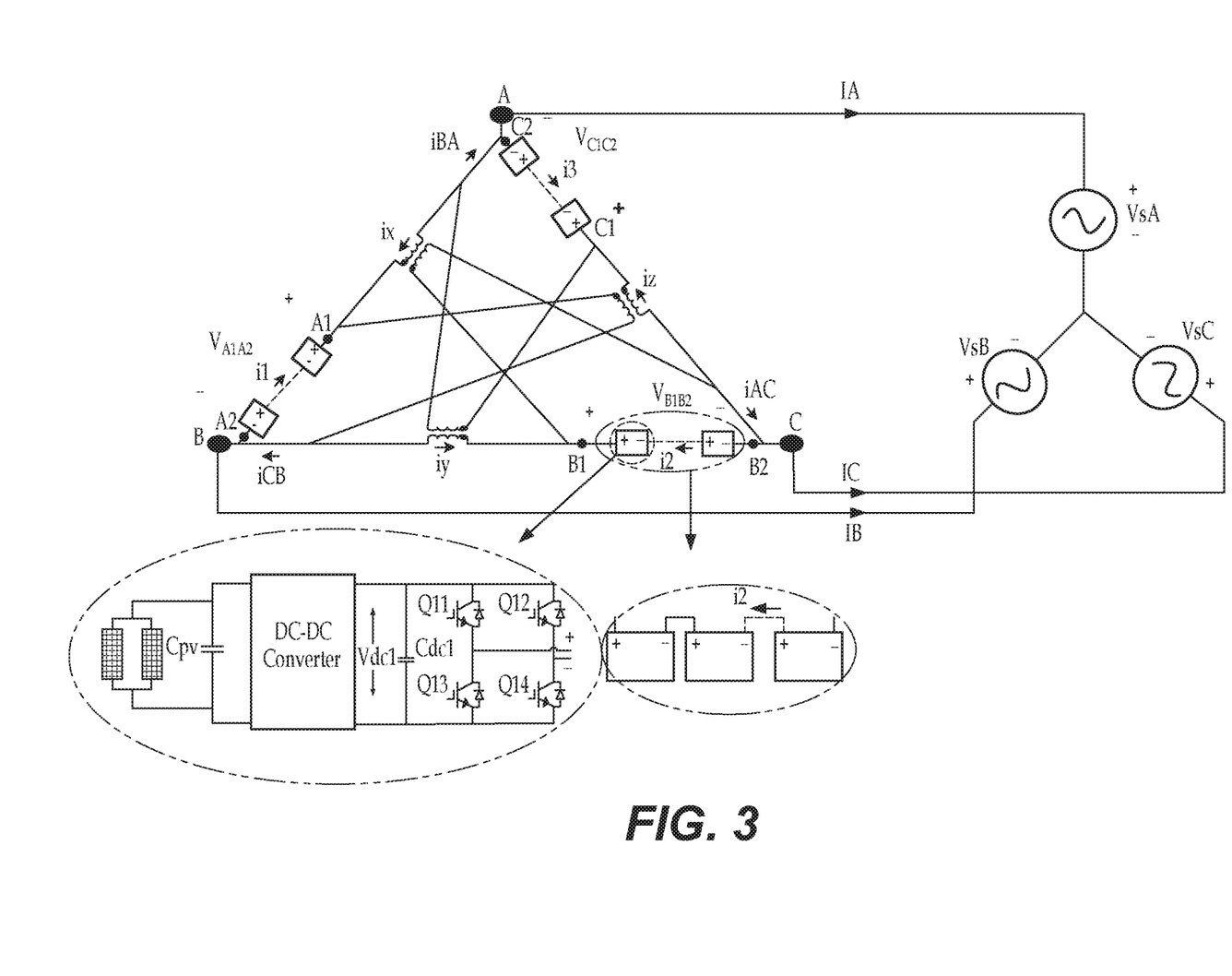
FIG. 3 is a schematic diagram showing the cascaded multilevel inverter of FIG. 2 configured for grid-connected photovoltaic (PV) application.

FIG. 3 is a schematic diagram showing the present CHB topology configured for photovoltaic (PV)-grid connection purposes. Each H-bridge is connected to PV modules via a DC-DC converter for maximum power point tracking purposes. The main aim of the inverter controller is to generate reference currents in the synchronous frame such that the disclosed topology provides only available active power at the DC-links to the grid with zero reactive power to guarantee unity power factor.

Figure 4:
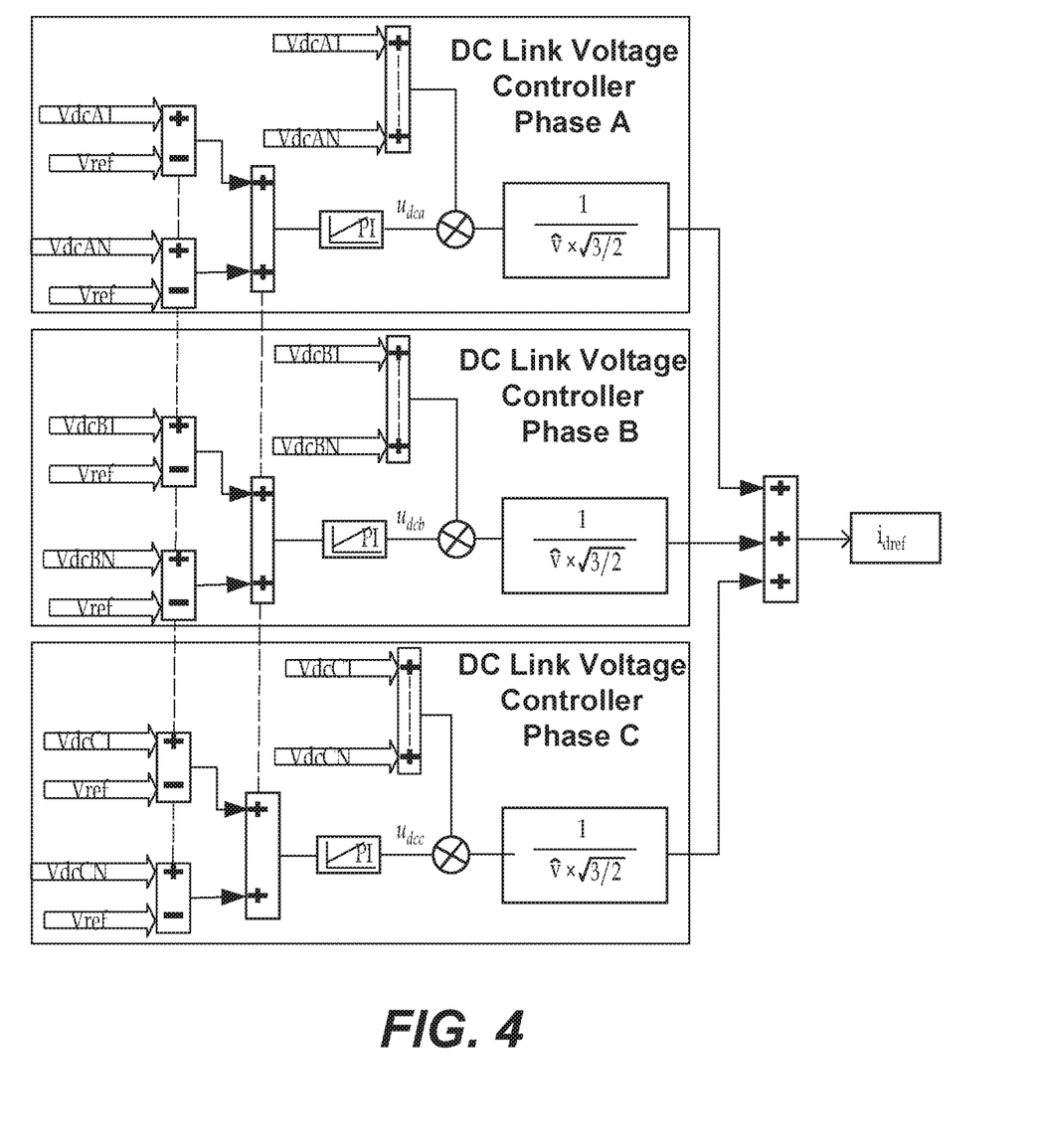
FIG. 4 is a schematic diagram showing a configuration DC-link voltage controllers for a three-phase delta-connected cascaded multilevel inverter configured as in FIG. 2.
Figure 5:
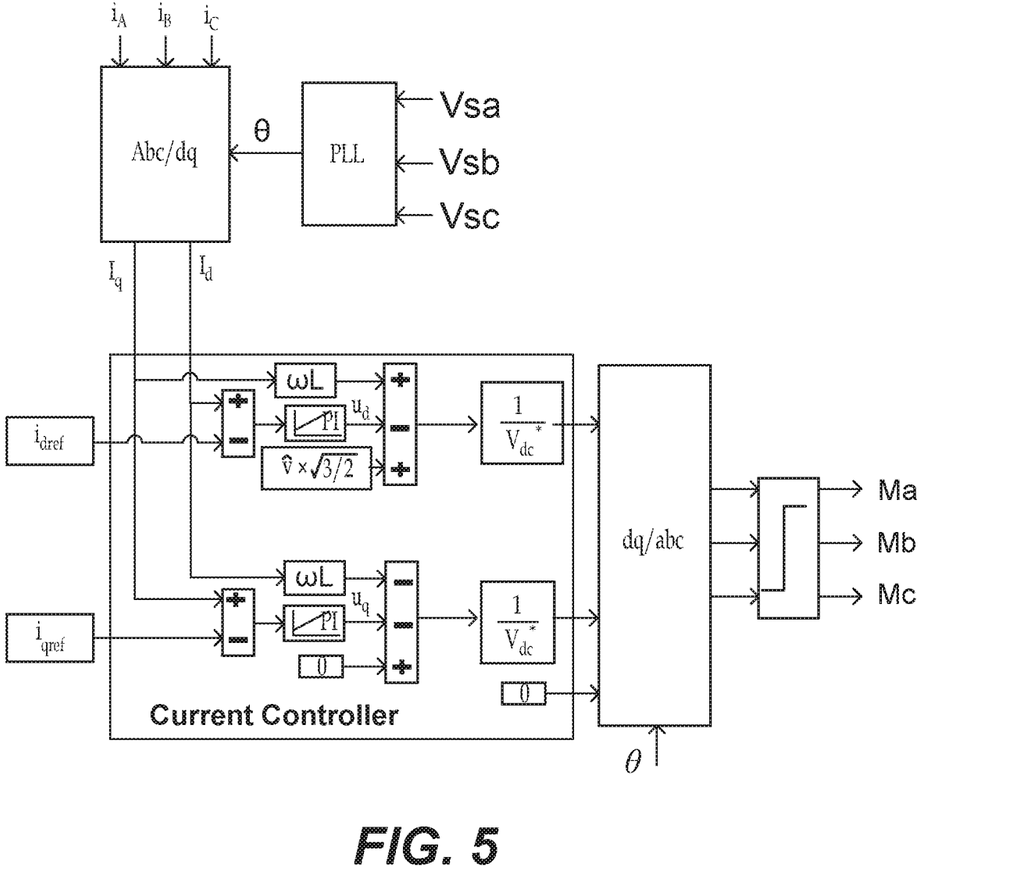
FIG. 5 is a schematic diagram of an exemplary current controller for use in the configurations of FIGS. 2 and 3.

FIG. 4 is a schematic diagram showing a configuration for DC-link voltage controllers as used in the configurations of FIGS. 2 and 3. FIG. 5 is a schematic diagram showing a configuration for an example current controller as used in the configurations of FIGS. 2 and 3. The disclosed control strategy is based on the classical control scheme of the inverter. This scheme is extended to control the disclosed multilevel inverter. The DC-links of phase a, $C_{dcA1}$, $C_{dcA2}$, ..., $C_{dcAN}$, are sharing the same active grid current of phase a, where $C_{dcA1}$, $C_{dcA2}$, ..., $C_{dcAN}$ are the DC-link capacitors connected to H-bridge cell 1, 2, ..., N, respectively, of phase a. The DC-link voltages of these capacitors are compared with their respective reference voltages. Assuming that the control system accurately regulates the DC-link voltages, then:

$$V_{dcA} = V_{dcB} = V_{dcC} = V_{dctot} \quad (14)$$

where $V_{dcA}$, $V_{dcB}$ and $V_{dcC}$ are the equivalent DC voltage across the DC-link capacitors connected to the phases a, b and c, respectively.

The modeling technique is based on Kirchhoff's law of the MLI in the dq frame, so that one gets:

$$V_d = L_s \frac{di_d}{dt} - (\omega L_s) i_q + d_{nd} V_{dctot} \quad (15)$$

$$V_q = L_s \frac{di_q}{dt} - (\omega L_s) i_d + d_{nd} V_{dctot}$$

where $L_s$, represents the leakage reactance of the coupled transformer, and $d_{nX}$, is defined as the sequential function and is given by:

$$\begin{bmatrix} d_{nA} \\ d_{nB} \\ d_{nC} \end{bmatrix} = \begin{bmatrix} C_A \\ C_B \\ C_C \end{bmatrix} - \frac{1}{3}(C_A + C_B + C_C) \quad (16)$$

where $C_A$, $C_B$ and $C_C$ are the equivalent DC-link capacitors connected to the phases a, b, and c, respectively.

The DC current can be defined as:

$$C_{dc}\frac{dV_{dctot}}{dt} = d_{nd}i_d + d_{nq}i_q \qquad (17)$$

A new equivalent model can be introduced to analyze the nonlinearity problems. These inputs may be written as:

$$u_d = (\omega L_s)i_q - d_{nd}V_{dctot} + V_d$$

$$u_q = (\omega L_s)i_d - d_{nq}V_{dctot} + V_q \qquad (18)$$

As stated above, the active current $i_d$ is responsible to regulate the DC link voltages and compensates for losses in the dissipative elements of the inverter. In addition, the reactive current $i_q$ should be set to zero to guarantee unity power factor. Therefore, equation (17) can be written as:

$$u_{dc} = C_{dc}\frac{dV_{dctot}}{dt} = d_{nd}i_d \qquad (19)$$

$$i_d = \frac{u_{dc}}{d_{nd}} \qquad (20)$$

In normal operation and under accurate current loop control, the following properties apply:

$$V_d \approx d_{nd}V_{dctot} = d_{nd}V_{dctot} = \sqrt{\frac{3}{2}}V_{max} \qquad (21)$$

where $V_{max}$ is the maximum value of the grid voltage. Replacing equation (21) into equation (20), one gets:

$$i_d = \sqrt{\frac{2}{3}}\frac{u_{dc}}{V_{max}}V_{dctot}. \qquad (22)$$

The active current $i_d$ is the active current, which is responsible to regulate the DC-link capacitors of each phase. From equation (22), the active reference current, which is responsible to regulate the DC-link capacitors of phase a, can be expressed as:

$$i_{dA} = \sqrt{\frac{2}{3}}\frac{u_{dcA}}{V_{max}}V_{dcA}. \qquad (23)$$

The reference active current of the grid is the sum of the three active current $i_d$:

$$i_{dref} = i_{dA} + i_{dB} + i_{dC} = \qquad (24)$$

$$\sqrt{\frac{2}{3}}\frac{u_{dcA}}{V_{max}}V_{dcA} + \sqrt{\frac{2}{3}}\frac{u_{dcA}}{V_{max}}V_{dcA} + \sqrt{\frac{2}{3}}\frac{u_{dcA}}{V_{max}}V_{dcA}$$

The disclosed control scheme based on the analysis above is shown in FIGS. 4 and 5. The reference active current of the grid $i_{dref}$ is compared with the actual active current $i_d$. The resulting error is inserted into the PI controller in order to keep the actual active current following the reference active current. On the other hand, the reference reactive current of the grid ($i_{qref}$=0) is compared with the actual reactive grid current $i_q$ to guarantee unity power factor. The resulting signals, $d_{nd}$ and $d_{nq}$ are transformed into abc modulation waveforms ($M_{refA}$, $M_{refB}$, and $M_{refC}$). These modulation waveforms are then applied to the phase shifted pulse-width modulation (PSPWM) in order to generate the required IGBTs pulses. PSPWM modulation technique causes equal sharing of losses among different switches. In addition, PSPWM needs only one carrier signal to generate the various necessary switching signals, and helps to reduce the THD in the generated MLI output voltage.

The disclosed topology is built in the SIMULINK environment to evaluate its performance. The system parameters used for simulation are shown in table 1:

TABLE 1

| Parameters for SIMULINK testing System Parameters | |
|---|---|
| DC Link Capacitor | 4 mF |
| DC-DC converter switching frequency fs | 30 kHz |
| Inverter switching frequency finv | 900 Hz |
| Per phase grid rated RMS voltage | 120 V |
| Reference voltage | 100 V |
| Coupling transformers | 1:1 turn ratios, L = 2 mH |

Figure 6A:
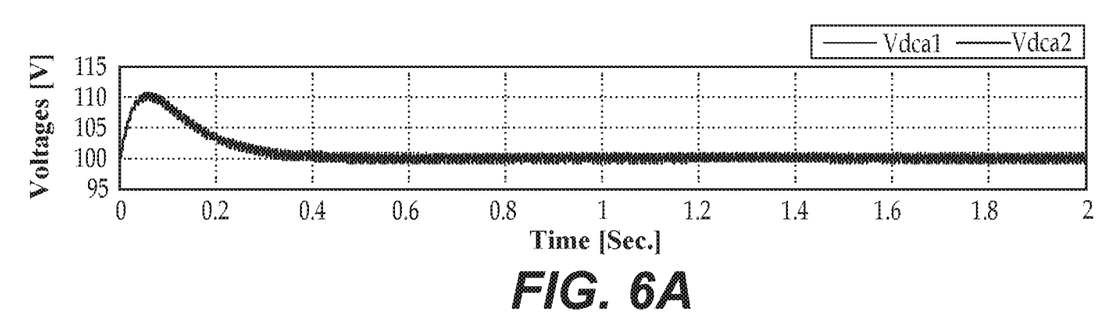
FIGS. 6A, 6B, and 6C are waveform diagrams from a simulation with two cascaded H-bridge inverters (as in FIG. 2) per phase, showing the DC-link voltages compared to the reference voltage.
Figure 6B:
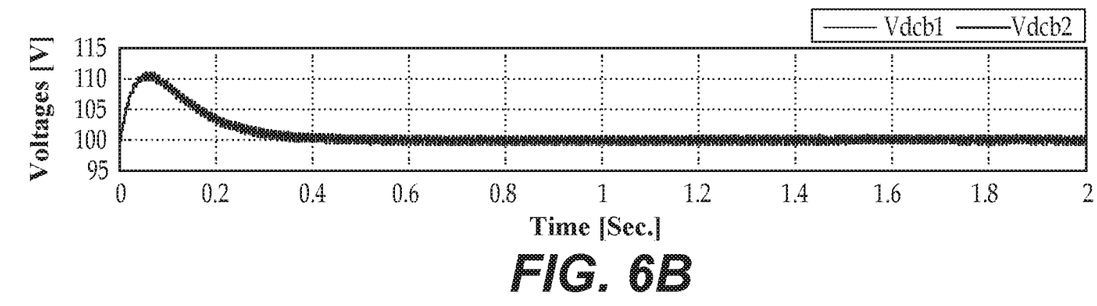
Figure 6C:
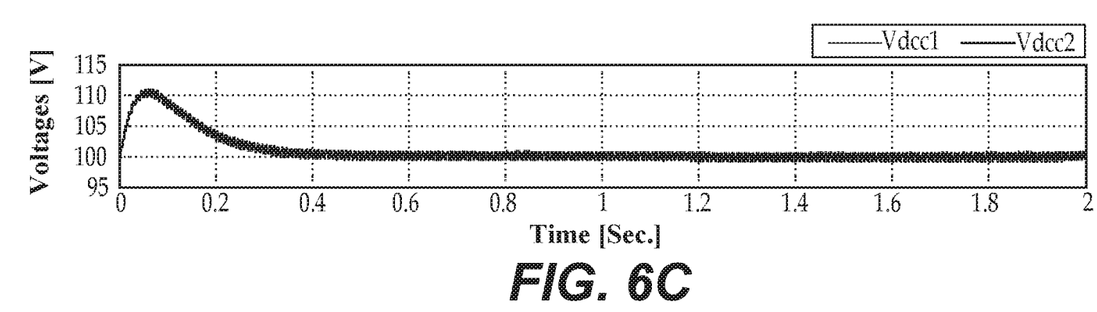

FIG. 6 is a graph showing DC-link voltages at reference voltages. For simplicity, two cascaded H-bridge cells are considered for each phase in the disclosed topology. The control scheme succeed in keeping the DC-link voltages at the reference voltages as illustrated in FIG. 6.

Figure 7A:
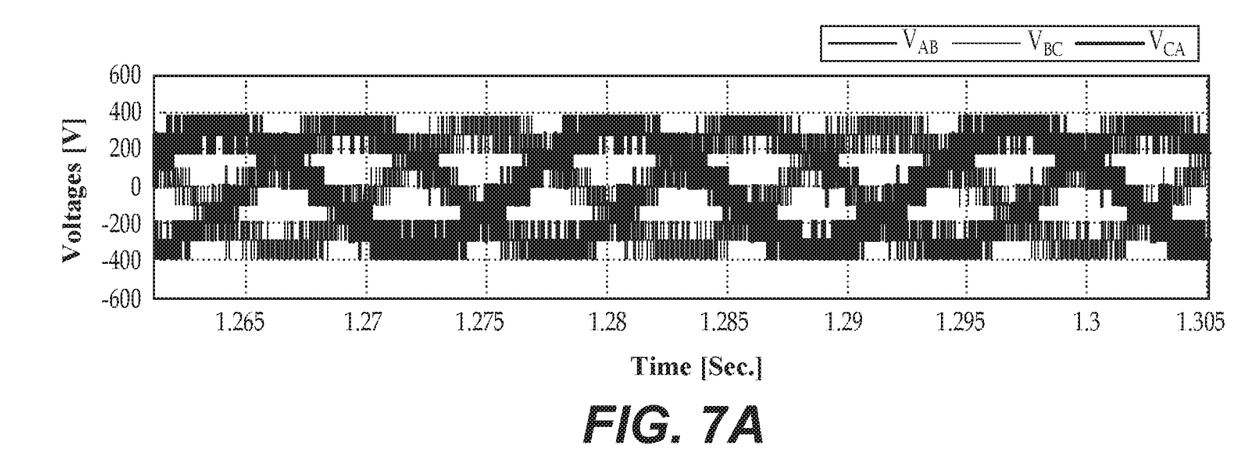
FIG. 7A is a graph of the three-phase line-line voltages generated in the simulation of FIGS. 6A-6C.
Figure 7B:
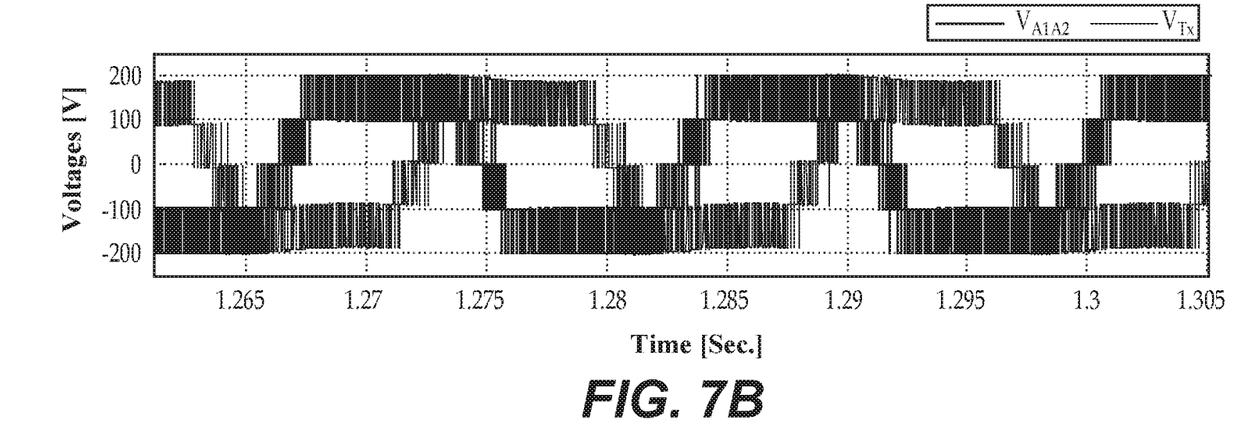
FIG. 7B is a graph of the voltage generated by the cascaded H-Bridge of phase a of the simulation of FIGS. 6A-6C, as well as the voltages generated across the transformers.

FIGS. 7A and 7B are graphs of voltages at the CHB, showing (FIG. 7A) the voltages across the three legs showing the generated three-phase line-line voltage, and (FIG. 7B) the voltages generated by the CHB of the phase across the transformers. As can be seen in FIGS. 7A and 7B, nine voltage levels are generated. This result coincides with the analysis of the disclosed topology in which it could generate seven line-line voltage levels (since only two cascaded H-bride cell are used per phase) as star-connected CHB do, while using the same number of switches. Three H-bridge cells must be used per phase in the conventional delta-connected CHB inverter of FIG. 1A in order to generate these same nine line-line voltage levels. In addition, FIG. 7B shows the voltages generated by the CHB of phase a ($V_{A1A2}$), as well as the voltage generated across the transformers $T_s$.

Figure 8A:
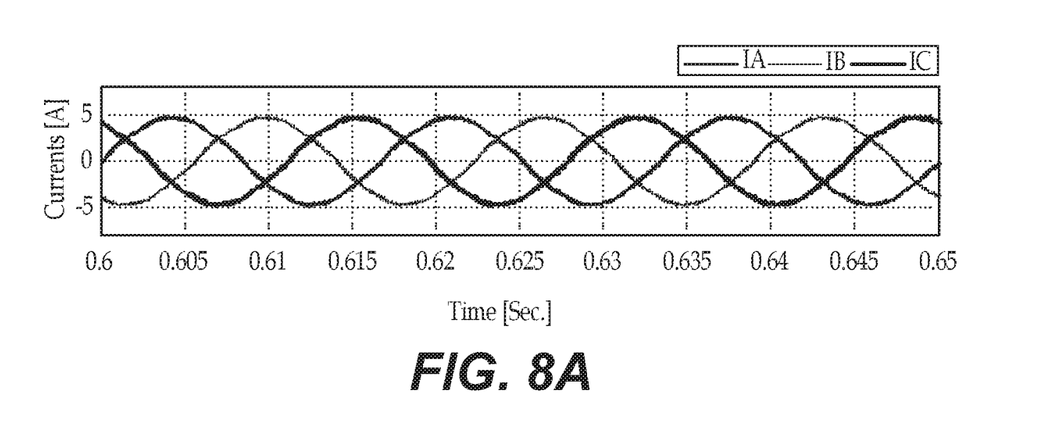
FIGS. 8A and 8B are graphs of currents for the simulation of FIGS. 6A-6C, showing grid currents (FIG. 8A), and currents passing in the cascaded H-bridge of each phase (FIG. 8B).
Figure 8B:
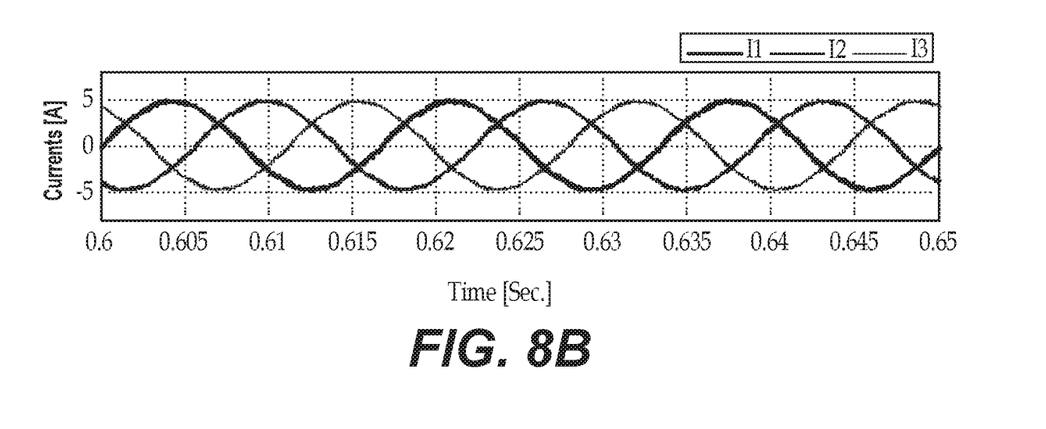

FIGS. 8A and 8B are waveform diagrams of currents at the CHB for the three phases, showing (FIG. 8A) grid currents, and (FIG. 8B) internal currents. As stated in the analysis, the grid currents coincide with the phase currents passing in each CHB. FIG. 8A shows the three-phase grid currents and FIG. 8B shows the currents passing in each CHB of each phase.

Figure 9:
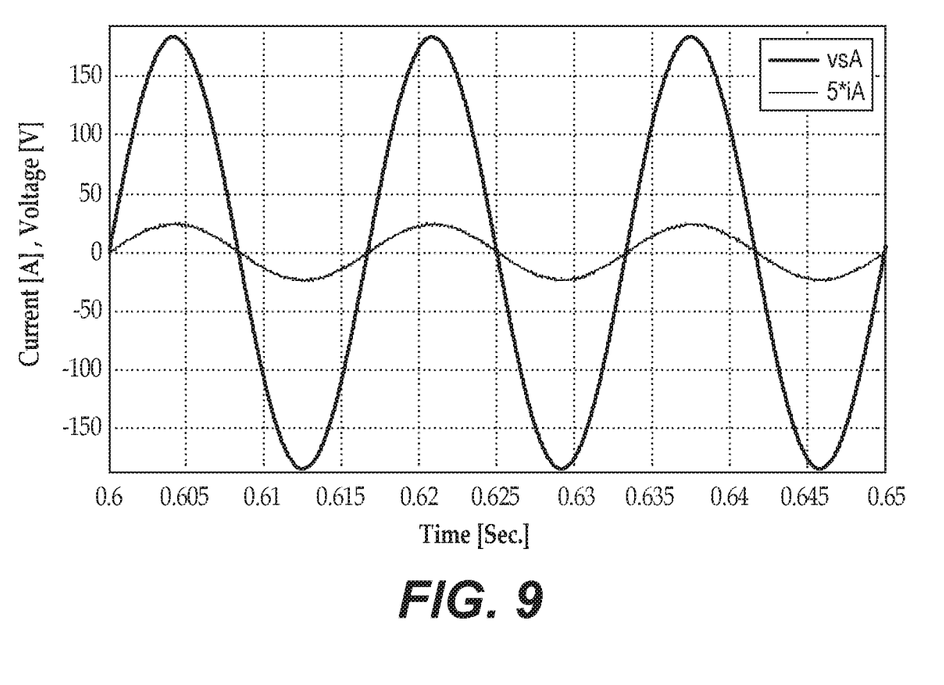
FIG. 9 is a graph showing grid current and grid voltage in phase a for the simulation of FIGS. 6A-6C, showing the power factor kept at unity.
Figure 10:
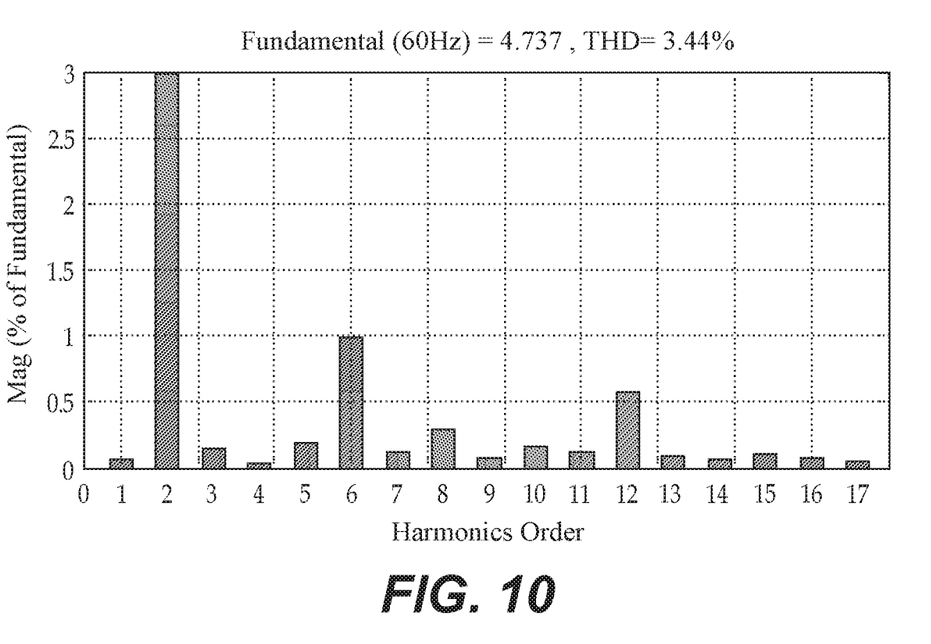
FIG. 10 is a chart showing the harmonic spectrum of the grid current for the simulation of FIGS. 6A-6C.

FIG. 9 is a waveform diagram showing grid current and grid voltage in phase, showing the power factor kept at unity. FIG. 10 is the harmonic spectrum of the current through the CHB. The current controller scheme succeeded in keeping the grid current in phase with the grid voltage, and hence the power factor is kept unity, as demonstrated in FIG. 9. The THD of the grid current $i_A$ is 3.44%, which has acceptable harmonic content less than 5% defined by IEEE standard. The harmonic spectrum of the grid current $i_A$ is shown in FIG. 10. The magnitude of the fifth harmonic order is approximately 1%. The magnitude of the other harmonic orders are less than 1%.

It is to be understood that the cascaded multilevel inverter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A cascaded multilevel inverter, comprising a delta-connected polyphase circuit having:
   a plurality of transformers corresponding to a number of phases of the multilevel inverter;
   a plurality of legs corresponding to the number of phases of the multilevel inverter, each leg including one of the transformers, the respective transformers each having an in-phase connection winding connected in series with a DC power supply and a cross-phase connection winding, the cross-phase connection winding being connected to respective ones of the other legs; and
   the plurality of transformers having their cross-phase connection windings connected to different phase legs with different ones of the transformers having their cross-phase connection windings connected on opposite sides of the in-phase connection windings within the leg connected to the cross-phase connection winding, the legs and transformer connections being configured in multiples of three.

2. The cascaded multilevel inverter of claim 1, wherein the multilevel inverter is a three-phase inverter.

3. The cascaded multilevel inverter of claim 1, wherein the multilevel inverter is a three-phase delta-connected cascaded H-bridge multilevel inverter.

4. The cascaded multilevel inverter of claim 1, wherein the plurality of transformers comprises three transformers in a three-phase delta-connected H-bridge multilevel inverter, the transformers performing an inductance function in each leg of the delta-connected H-bridge multilevel inverter.

5. The cascaded multilevel inverter of claim 1, further comprising a polyphase star-connected output connection with a number of phases corresponding to the number of phases of the inverter, and supplied from respective output nodes from delta circuit.

6. The cascaded multilevel inverter of claim 1, wherein the DC power supply comprises at least one circuit including:
   a connection for an external DC power supply;
   a DC-DC converter capable of providing a DC output at a design output voltage; and
   an H-bridge circuit receiving the DC output.

7. The cascaded multilevel inverter of claim 1, wherein the DC power supply comprises at a plurality of circuits, each of the circuits including:
   a connection for an external DC power supply;
   a DC-DC converter capable of providing a DC output at a design output voltage; and
   an H-bridge circuit receiving the DC output, the plurality of circuits being connected in series for each respective phase.

8. A method of inverting DC current to provide a polyphase AC output, comprising the steps of:
   connecting a plurality of legs, at end connections, and cross-connecting the legs with at least one transformer per leg, cross-connected to at least two other legs of the plurality of legs, each of the at least one transformers having an in-phase connection winding and a cross-phase connection winding to respective other legs of the plurality of legs;
   for each of the legs, connecting a DC power supply in series with the respective leg, so that each of the legs includes one of the at least one transformers, the respective transformers having the in-phase connection windings connected in series with a DC power supply; and
   configuring the legs and transformer connections in multiples of three.

9. The method of claim 8, further comprising configuring the legs and transformer connections as a three-phase delta-connected inverter.

10. The method of claim 8, further comprising configuring said inverter as a three-phase delta-connected cascaded H-bridge multilevel inverter.

11. The method of claim 8, further comprising configuring the plurality of transformers to comprise three transformers in a three-phase delta-connected H-bridge multilevel inverter, the transformers performing an inductance function in each leg of the delta-connected H-bridge multilevel inverter.

12. The method of claim 8, further comprising providing the inverter as a polyphase star-connected output connection with a number of phases corresponding to the number of phases of the inverter, and supplied from respective output nodes from delta circuit.

13. The method of claim 8, wherein the DC power supply comprises at least one circuit having:
   a connection for an external DC power supply;
   a DC-DC converter capable of providing a DC output at a design output voltage; and
   an H-bridge circuit receiving the DC output.

14. The method of claim 8, wherein the DC power supply includes a plurality of circuits, each circuit having:
   a connection for an external DC power supply;
   a DC-DC converter capable of providing a DC output at a design output voltage; and
   an H-bridge circuit receiving the DC output, the plurality of circuits being connected in series for each respective phase.

* * * * *